United States Patent
Rouch

[11] 3,887,249
[45] June 3, 1975

[54] JOURNAL BEARING FOR SUPPORTING BOTH RADIAL LOADS AND AXIAL THRUST LOADS

[75] Inventor: Keith E. Rouch, Greendale, Wis.
[73] Assignee: Allis-Chalmers Corporation, Milwaukee, Wis.
[22] Filed: Apr. 8, 1974
[21] Appl. No.: 459,116

[52] U.S. Cl. .................................................. 308/73
[51] Int. Cl. ........................................... F16c 17/06
[58] Field of Search ...................... 308/73, 115, 119

[56] References Cited
UNITED STATES PATENTS

| | | | |
|---|---|---|---|
| 1,593,251 | 7/1926 | Flintermann | 308/73 |
| 1,900,874 | 3/1933 | Wallgren | 308/73 |
| 2,172,486 | 9/1939 | Wallgren | 308/73 |
| 2,743,142 | 4/1956 | Balsiger | 308/73 |
| 3,370,334 | 2/1968 | Pilarezyk et al. | 308/73 |
| 3,711,169 | 1/1973 | Gardner | 308/73 |

Primary Examiner—Lloyd L. King
Attorney, Agent, or Firm—Robert C. Sullivan

[57] ABSTRACT

A journal bearing of the pivoted pad type is provided which is adapted to support a thrust load as well as a radial load. A plurality of circumferentially spaced arcuate bearing pads underlie a rotating journal such as, for example, the trunnion of a rotatable grinding mill. The respective bearing pads are each provided with a pivotal support which permits the respective bearing pads to undergo small rotations about at least two axes and preferably about three axes (radial, circumferential, and axial) as dictated by the lubricating oil film formed at the interface between the bearing pad and the radially outer cooperating surface of the journal. The opposite axial ends of one or more of the respective pivoted bearing pads are inclined to define thrust faces which cooperate with similarly inclined thrust faces or thrust shoulders on the journal to resist axial thrust loads on the rotating journal.

The inclined thrust faces on the bearing pad and the corresponding cooperating thrust faces on the rotating journal are inclined at some angle to the $r$ - $\theta$ plane (i.e. — the radial force — circumferential force plane) whereby to reduce the net moment induced on the bearing pad, and whereby to reduce the disturbing effect of the thrust force on the oil film supporting the radial load $R_o$. Preferably, the angle of inclination of the thrust face of the bearing pad (and the corresponding angle of inclination of the thrust shoulder of the rotating journal) is such that the resultant force T of the axial force component $Z_T$ and of the radial force component $R_T$ acting on the thrust face of the bearing pad passes through the pivot point on which the bearing pad is pivotally supported, to thereby induce minimal moment on the bearing pad with consequent minimal disturbing effect on the lubricating oil film supporting the main radial load $R_o$.

11 Claims, 7 Drawing Figures

3,887,249

JOURNAL BEARING FOR SUPPORTING BOTH RADIAL LOADS AND AXIAL THRUST LOADS

BACKGROUND OF THE INVENTION

1. Field of the Invention

This invention relates to journal bearings, and more particularly to a journal bearing of the pivoted pad type which is adapted to support a thrust load as well as a radial load.

2. Description of the Prior Art

In certain types of apparatus journalled for rotation in pivoted-pad bearings, such as a large rotary grinding mill, for example, not only must radial and circumferential forces be resisted, but axial thrust forces due to gear loading and other factors must also be resisted. For example, the use of a helical gear drive for rotatably driving the apparatus which is journalled in the bearing structure produces an axial thrust, the direction of the axial thrust being opposite for opposite directions of rotation of the helical gear drive. Various operating conditions imposed upon the apparatus which is journalled for rotation may also impose axial thrust forces on the apparatus and on the bearing supports thereof.

It has been the practice in the prior art of bearing structures in general to provide a separate thrust bearing for the purpose of resisting the thrust load. An example of such a thrust bearing is shown, for example, in U.S. Pat. No. 3,667,819 issued to Raymond C. Jenness. Examples of pivoted-pad bearings are shown, for example, by U.S. Pats. 1,161,721 to Parsons and 3,002,123 to Gruber.

The use of a separate thrust bearing for resisting axial thrust forces in accordance with the prior art practice requires more space and complicates the bearing support structure.

STATEMENT OF THE INVENTION

Accordingly, it is an object of the present invention to provide a pivoted-pad journal bearing which is adapted to support a thrust load as well as a radial load.

It is a further object of the invention to provide a bearing structure for a rotating apparatus which is capable of resisting both radial loads and also axial thrust loads in less space and with a less complicated bearing support structure than prior art arrangements.

It is another object of the invention to provide a journal bearing of the pivoted-pad type which in addition to resisting radial forces on the bearing is also adapted to resist axial thrust forces in such manner as to have minimal disturbing effect on the lubricating oil film supporting the radial load.

In achievement of these objectives, there is provided in accordance with an embodiment of the invention a journal bearing of the pivoted pad type which is adapted to support a thrust load as well as a radial load. A plurality of circumferentially spaced arcuate bearing pads underlie a rotating journal such as, for example, the trunnion of a rotatable grinding mill. The respective bearing pads are each provided with a pivotal support which permits the respective bearing pads to undergo small rotations about at least two axes and preferably about three axes (radial, circumferential, and axial) as dictated by the lubricating oil film formed at the interface between the bearing pad and the cooperating radially outer surface of the journal. The opposite axial ends of one or more of the respective pivoted bearing pads are inclined to define thrust faces which cooperate with similarly inclined thrust faces or thrust shoulders on the journal to resist axial thrust loads on the rotating journal.

The inclined thrust faces on the bearing pads and the corresponding cooperating thrust faces on the rotating journal are inclined at some angle to the $r - \theta$ plane (i.e., — the radial force — circumferential force plane) whereby to reduce the net moment induced on the bearing pad, and whereby to reduce disturbing effect of the thrust force on the oil film supporting the radial load. Preferably, the angle of inclination of the thrust face of the bearing pad (and the corresponding angle of inclination of the thrust shoulder of the rotating journal) is such that the resultant force T of the axial force component $Z_T$ and of the radial force component $R_T$ acting on the thrust face of the bearing pad passes through, or at least substantially or approximately through, the pivot point on which the bearing pad is pivotally supported to thereby induce minimal moment on the bearing pad with consequent minimal disturbing effect on the lubricating oil film supporting the main radial load $R_o$.

Further objects and advantages of the invention will become apparent from the following description taken in conjunction with the accompanying drawings in which:

BRIEF DESCRIPTION OF THE DRAWINGS

FIG. 3(2) is an enlarged schematic view similar to FIG. 3 showing the forces acting on one of the inclined thrust surfaces;

DESCRIPTION OF PREFERRED EMBODIMENT

Figure 1:
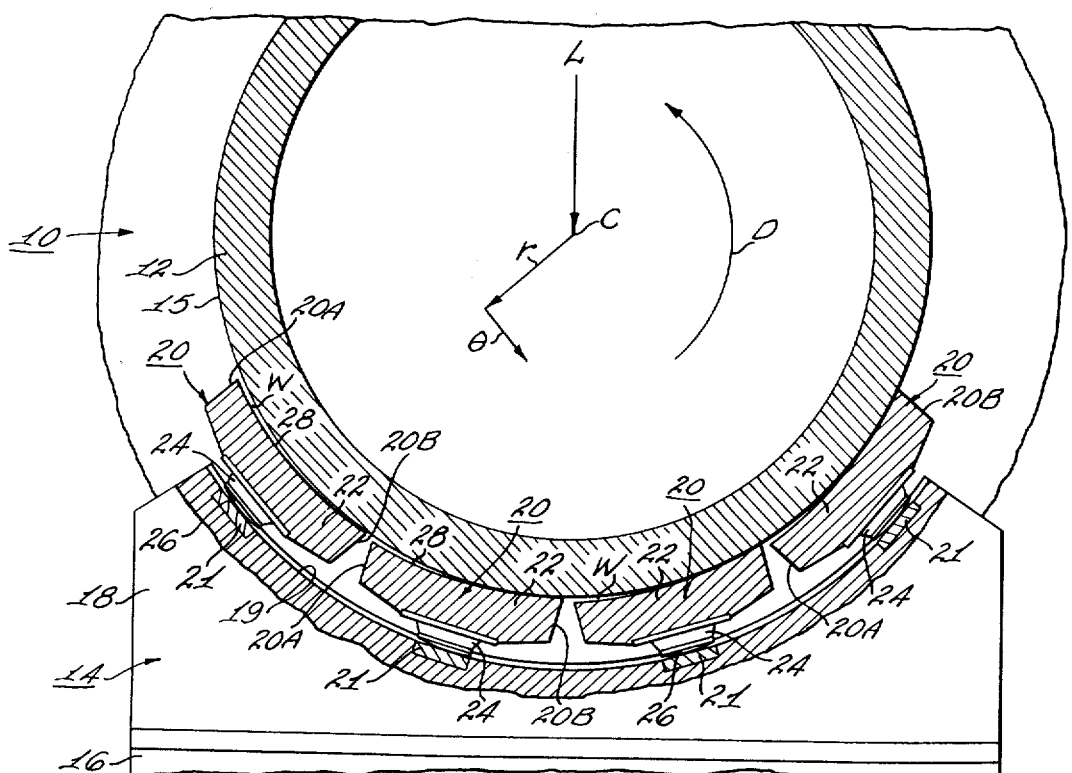
FIG. 1 is a view substantially along line I—I of FIG. 2 showing a grinding mill journalled for rotation in a bearing structure in accordance with the invention.
Figure 2:
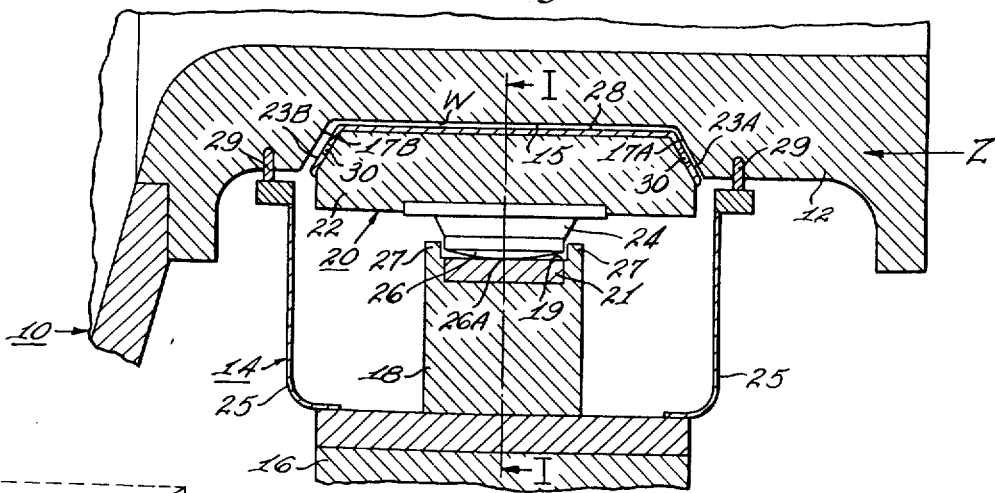
FIG. 2 is a view in axial section of the structure of FIG. 1.

Referring now to the drawings and more particularly to FIGS. 1 and 2, there is shown a rotary grinding mill generally indicated at 10 of the type used for grinding mineral ore or the like and having a hollow trunnion 12 which is mounted on a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill, except for the fact that the inclined thrust faces to be described are frequently only used on pivoted bearing pads at one end of the mill.

The bearing structure generally indicated at 14 comprises a normally vertical bearing pedestal 16 on the upper surface of which is suitably mounted an upwardly open bearing support 18. The upper surface 19 of bearing support 18 is an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the respective bearing pads 20 to be described. It will be noted that bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 25 is mounted on the upper end of bearing pedestal 16 in enclosing relation to the bearing structure to prevent contamination and loss of bearing lubricant. The upper end of housing 25 supports suitable seals 29 which engage the periphery of the rotating trunnion 12.

A plurality of bearing pads (in the case of the illustrated embodiment, four) each respectively generally indicated at 20 underlie the lower surface of trunnion 12 in supporting relation to the trunnion. Bearing pads 20 are spaced from each other a short distance circumferentially of trunnion 12. Each bearing pad 20 comprises a pad portion 22 which extends circumferentially and axially of the trunnion 12 in underlying supporting relation to the trunnion. Each bearing pad 20 also includes a pivot support portion 24 which is suitably secured to the radially outer portion of each respective pad portion 22 or which may be integral with the bearing pad portion 22. The radially outer surface 26 of each pivot portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed between the radially inner surface 28 of pad portion 22 and the radially outer cooperating surface 15 of the trunnion. The radially outer spherical or convex surface 26 of the pivot support 24 of each respective bearing pad 20 is adapted to bear against one of the inserts 21 in arcuate surface 19 of bearing support 18.

The outer periphery of the journal or trunnion 12 is provided with an axially extending and circumferentially extending countersunk surface 15 which is adapted to radially overlie the bearing surface 28 of pad 20, and the countersunk surface 15 on the rotating journal 12 is bounded at the opposite axial ends thereof by oppositely inclined thrust shoulders on journal 12, respectively indicated at 17A and 17B.

The oil pressure developed in the lubricating oil film at the interface between the radially inner bearing surface 28 of each respective bearing pad portion 22 and the radially outer surface 15 of trunnion 12 supports the load L and may be due to hydrodynamic action of the lubricating fluid (due to relative motion between surfaces 28 and 15) or may be due to hydrostatic operation of the lubricant supplied by a relatively high pressure external pump. During normal running operation, assuming counterclockwise rotation of trunnion 12 as viewed in FIG. 1, low pressure oil is normally supplied to the interface between surface 28 of bearing pad 20 and surface 15 of trunnion 12 through a discharge passage 29A (FIGS. 1 and 4) in surface 28 of pad 20 near the leading edge 20A of pad 20 relative to the counterclockwise direction of rotation.

If the direction of rotation of trunnion 12 were clockwise relative to FIG. 1, low pressure oil would be supplied to the interface between surfaces 28 and 15 through discharge passage 29B near the "leading" edge 20B for clockwise rotation.

Discharge passages 29A and 29B are supplied by suitable internal passages (not shown) in bearing pad 20 which in turn are connected to a source of low pressure oil supply. High pressure oil for hydrostatic operation, particularly during the starting-up, shut down and inching operation of the grinding mill, may be supplied through centrally located discharge opening 31 (FIG. 4) in bearing face 28 of the bearing pad 20. Discharge opening 31 is connected by suitable internal passages 32 in pad 20 to a source of high pressure oil.

Figure 3A:
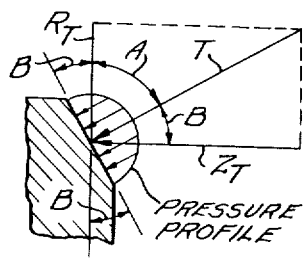
FIG. 3 is a schematic diagram showing the vector relation of the various forces acting on the bearing structure.
Figure 3:
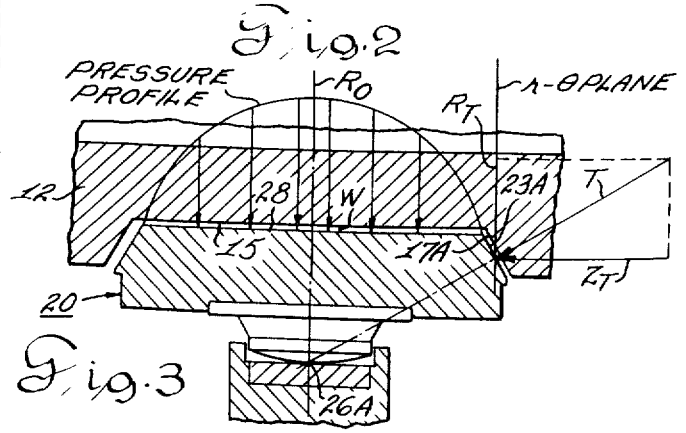
Figure 6:
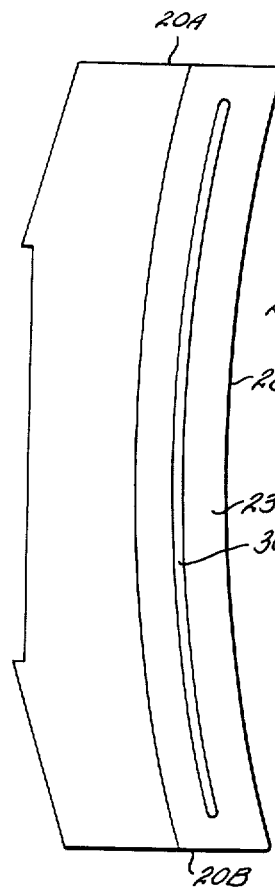
FIG. 6 is an end elevation view of the bearing pad portion of the pivoted bearing pad (with pivot support portion not shown).

There is diagramatically shown in FIG. 3 the pressure profile exerted by the radial load on the bearing surface 28 of bearing pad 20. The total radial pressure on the pad surface 28 can be represented by a vector $R_o$ which extends perpendicularly to and through the center of pad surface 28, the line of action of vector $R_o$ under balanced conditions normally passing through the pivot point 26A of the bearing pad. As will be explained hereinafter, the resultant force T acting on the thrust face 23A or 23B, also shown in FIGS. 3 and 3($a$), includes a radial component $R_T$. The radial component $R_T$ generally has a magnitude which is only a small fraction of the magnitude of the main radial load $R_o$ acting on bearing pad surface 28. The total radial load $R_{ToT}$ on the bearing structure is the sum of $R_o$ and $R_T$. That is, expressed in equation form, $R_{ToT} = R_o + R_T$, where $R_o$ is the main radial load acting on bearing surface 28, and $R_T$ is the radial component of the resultant T acting on thrust face 23A or 23B, depending on which one of the thrust faces 23A or 23B is taking the thrust.

As best seen in the view of FIGS. 2, 4, 5, 6 the opposite axial ends of the respective pivoted bearing pads 20 are inclined or tapered as indicated at 23A and 23B, respectively, to define a thrust face on each of the respective opposite axial ends of the bearing pad 20 which cooperates with the corresponding parallel inclined thrust face or shoulder 17A or 17B of the rotating journal. Each respective thrust face 23A, 23B extends in a downwardly inclined direction relative to the views shown in the drawings, starting at the radially inner bearing face 28 of the respective pivoted bearing pad. Each respective thrust face 23A, 23B of the bearing pad 20 is inclined in a plane which is substantially parallel to the plane of the corresponding thrust face or shoulder 17A or 17B on journal or trunnion 12. Each thrust face 17A, 17B also extends arcuately along the entire arcuate peripheral length of its corresponding pivoted bearing pad 20 to in effect define a frusto-conical surface on the corresponding end of the bearing pad.

The inclined thrust faces 23A, 23B of the bearing pad 20 and the corresponding thrust faces 17A, 17B on journal 12 are inclined at some angle to the $r$ - $\theta$ plane whereby to reduce the moment induced on bearing pad 20 by the axial thrust load. Preferably the angle of inclination of each thrust face 23A, 23B on pad 20 and of the cooperating thrust faces 17A, 17B on journal 12 is made such that the resultant force T of the radial force component $R_T$ acting on thrust face 23A or 23B and of the axial thrust force component $Z_T$ acting on thrust face 23A or 23B passes approximately or substantially through the pivot point 26A on which bearing pad 20 is pivotally supported, to thereby induce minimal moment on the respective pad 20 and thus minimize disturbing effect on the lubricating oil film at the interface 15–28 supporting the main radial load $R_o$. In actual practice, in a large bearing for a grinding mill or the like the pivot "point" 26A may be several inches or more in diameter.

This preferred relationship of the direction of the resultant force T acting on thrust face 23A to pivot point 26A is best seen in the diagrammatic illustrations of FIGS. 3 and 3(a) which shows a vector diagram in which the vector $R_T$ which represents the radial force component acting on the thrust face 23A of bearing pad 20 and the vector $Z_T$ which represents the axial thrust force component acting on the thrust face 23A of bearing pad 20, and which is therefore perpendicular to the radial load component $R_T$, have a resultant T which is substantially perpendicular to the interface between the cooperating thrust shoulder 17A on the journal or trunnion 12 and thrust surface 23A on bearing pad 20, the line of force of resultant T passing through pivot point 26A of bearing pad 20. The pressure profile of the forces acting on thrust face 23A of bearing pad 20 is diagrammatically shown in FIG. 3(a) and the summation of these forces can be represented by the vectors $R_T$, $Z_T$ and by the resultant T.

As seen in the vector diagram of FIG. 3, the magnitude of the radial component $R_T$ of the resultant force T acting on thrust face 23A can be expressed by the equation: $R_T = T\cos A$ where A is the angle subtended between T and $R_T$.

Similarly, the magnitude of the axial thrust component $Z_T$ can be expressed by the equation: $Z_T = T\cos B$ where B is the angle subtended between T and $Z_T$. Also B = 90° - A. B is also the angle of inclination of the inclined thrust face 23A relative to the r - θ plane.

It is a known fact in bearing technology that the resultant force T acting on the oil-film-covered-surface such as inclined thrust surface 23A must be substantially perpendicular to the surface 23A and to the oil film thereon. Furthermore, the line of force of resultant T will be substantially through the geometric center of the inclined thrust surface 23A.

It can be seen that in the arrangement shown in FIGS. 2 and 3, in accordance with the present invention, the direction of the resultant T acting on thrust surface 23A, the location of pivot point 26A, and the inclination of the parallel inclined thrust faces 17A, 23A are all so related that the resultant T acting on the thrust face which is taking the thrust (such as 23A in FIG. 2) passes through pivot point 26A, which is the preferred relationship. The relative magnitudes of the radial force component vector $R_T$ and of the axial thrust force component vector $Z_T$ depend upon the details of the particular apparatus being journalled for rotation, including the type of drive for the apparatus which is journalled for rotation. For example, as previously mentioned, use of a helical gear drive produces an axial thrust force and the axial direction of the thrust force is reversed if the direction of rotation of the helical drive is reversed.

Knowing the area of the thrust face 23A necessary to accommodate a predetermined anticipated thrust load, and further knowing that the resultant force T on the thrust face 23A acts substantially at the geometrical center of the thrust face and thus at the midpoint of length of the inclined edge of surface 23A as viewed in FIGS. 2 and 3, further knowing that the resultant T acts substantially perpendicularly to the surface 23A as seen in FIGS. 2 and 3, and further knowing the location of the pivot point 26A, the surface 23A can be made to incline at an angle B relative to the r - θ plane (FIG. 3) such that the resultant T will pass through pivot point 26A.

Figure 4:
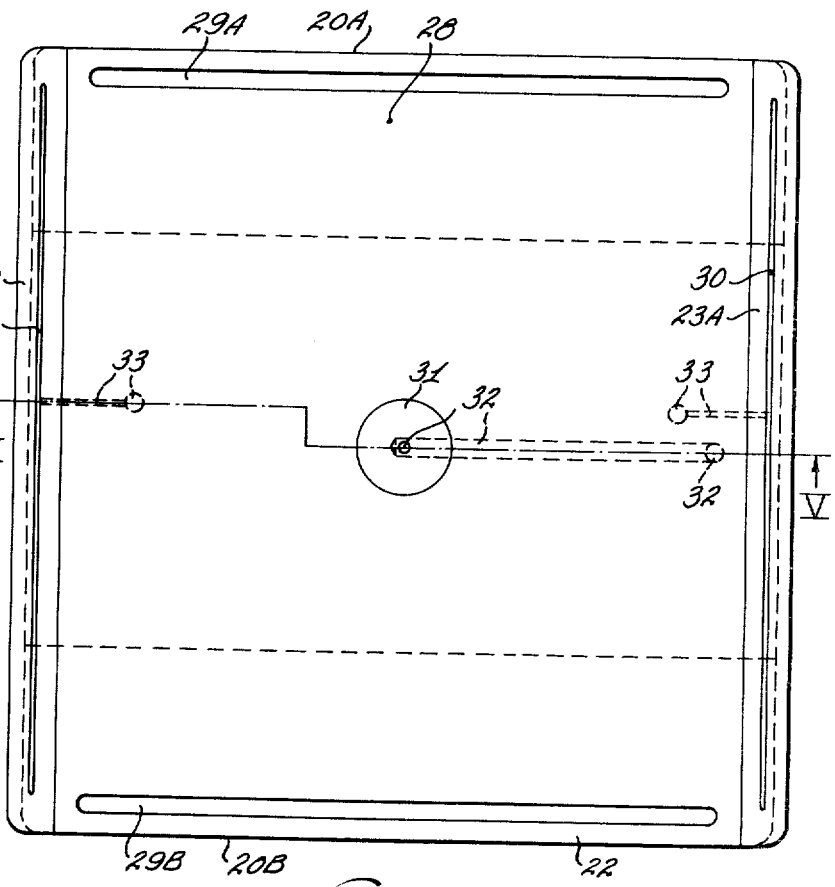
FIG. 4 is a top plan view of the bearing pad portion of one of the pivoted bearing pads used in the bearing structure of FIGS. 1 and 2.
Figure 5:
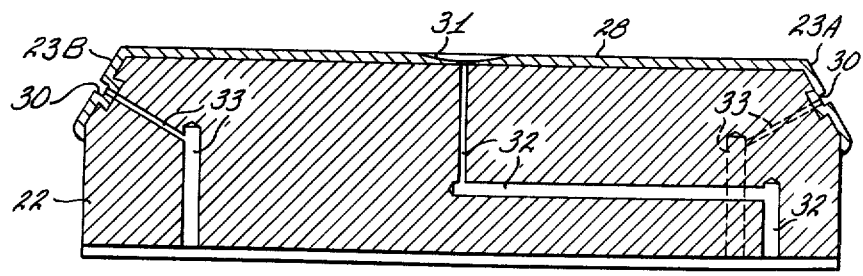
FIG. 5 is a longitudinal sectional view along line V—V of FIG. 4 of the bearing pad portion of the pivoted bearing pad extending in a direction axially of the journalled member (with pivot support portion not shown)

As best seen in FIGS. 2, 4 and 5, oil discharge passages 30 are provided in each thrust face 23A, 23B of each respective bearing pad 20 and oil is supplied at a suitable flow rate and pressure by an external pump to discharge passages 30 through suitable internal passages 33 in the bearing pad 20 which in turn are connected to the source of supply, the oil passing through the corresponding discharge passages 30 to the interface between the cooperating thrust surfaces such as 17A-23A or 17B-23B. Each oil discharge passage or means 30 is in the form of an oil distribution groove which extends for most of the arcuate length of the thrust face 23A, or 23B in which it is located. In an installation in which the interface 17A-23A is subjected to high thrust forces the oil pressure at the interface 17A-23A may be developed hydrostatically from a high pressure pump source connected to discharge passages 30 which may provide an oil pressure at the thrust interface 17A-23A of the order of magnitude of 400 pounds per square inch, for example. On the other hand, if the given installation is such that the thrust surfaces 17A-23A are subjected to only relatively low thrust pressures, then the discharge passages 30 in the thrust faces 17A-23A may be connected to a low pressure oil pump, and the oil pressure at the interface 17A-23A may be developed hydrodynamically by the relative rotation between the thrust surfaces 17A and 23A.

Because the axial thrust force along the z axis is usually only a fraction of the magnitude of the main radial load $R_o$ on the bearing pad surface 28, the friction developed at the pivot point 26A should be sufficient to maintain pad location. However, as a precautionary measure, the pads 20 are restrained from excessive motion in the z direction by oppositely disposed mechanical stops 27 carried by the bearing support 18. Stops 27 are so located as to permit any anticipated pivotal motion of pad 28.

BRIEF DESCRIPTION OF OPERATION

As the journal or trunnion 12 rotates, the supporting bearing pads 20 tilt to form a hydrodynamic oil film between each pad 20 and the journal 12, as is well known in the art. For a given direction of rotation, for example, the counterclockwise direction indicated by the arrow D in the view of FIG. 1, the respective bearing pads 20 will tilt in such manner as to provide a wedge of oil indicated at W between the pad bearing surface 28 and the journal 12 contiguous the leading edge 20A of given bearing pad 22, with respect to the direction of rotation of journal 12. The "leading edge" is defined as that edge of the bearing pad 20 first reached by a given point P on the periphery of the rotating journal 12 for a given direction of rotation of journal 12. If the direction of rotation were clockwise relative to the view of FIG. 1, the wedge W of oil would instead be formed contiguous edge 20B of bearing pad 20, which would be the leading edge for the clockwise direction of rotation.

Low pressure oil for providing the oil wedge W is supplied through one or the other of the oil discharge passages 29A or 29B, depending on whether edge 20A or 20B is the "leading" edge of bearing pad 20 relative to the direction of rotation.

For a given direction of rotation, the thrust will normally be between one of the thrust shoulders on the journal such as 17A and the cooperating thrust shoulder 23A on bearing pad 20. If the direction of rotation of the journal 12 is reversed, particularly with a helical gear drive, the thrust will normally be between the opposite cooperating thrust members such as the thrust surface 17B on the journal and the cooperating thrust surface 23B on the bearing pad.

During operation, oil is supplied to the thrust interfaces 17A-23A etc. at a predetermined required flow and pressure for either hydrostatic operation or hydrodynamic operation (depending upon the thrust values at interface 17A-23A) as previously described by a suitable external pump through discharge passages 30 at thrust faces 23A, 23B to the interface between the cooperating thrust surfaces 17A-23A and 17B-23B. In the illustrative example shown in FIG. 2 where it is assumed that the axial thrust is being taken by the cooperating thrust surfaces 17A and 23A, oil pressure develops in the relatively small clearance space between these facing thrust surfaces 17A-23A which are absorbing the thrust in the particular example shown. The opposite thrust faces in FIG. 2, namely 17B on the journal 12 and 23B on the bearing pad 20 which are assumed to be not taking the thrust, develop little or no oil pressure therebetween, although oil is supplied to the interface between thrust surfaces 17B and 23B, due to the fact that the clearance at the interface between the thrust surfaces 17B-23B in FIG. 2 is sufficiently large to allow unrestricted flow of lubricant at this interface. In fact, in the illustrated example where the thrust forces are between thrust faces 17A-23A, oil need not be supplied to the opposite thrust faces 17B-23B. Suitable external valves may be used to selectively control the flow of oil to the proper interface 17A-23A or 17B-23B.

The thrust bearing faces such as 23A, 23B on the pivoted bearing pad 20 and also the bearing surface 28 on pad 20 can either be in the form of separate pads or facings of suitable metal or the like suitably attached to the outer face of the bearing pad 22, as shown in FIG. 2; or alternatively, the thrust bearing faces such as 23A, 23B and also bearing surface 28 could be integral faces on the main body of the respective bearing pads 20.

Due to the fact that the angle of inclination of the thrust faces 17A-23A relative to the $r - \theta$ plane is such that the line of action of resultant T of the forces acting on thrust face 23A or 23B passes substantially through the pivot point 26A of pivoted bearing pad 20, the resultant T will induce minimal moment on bearing pad 20 about its pivot point 26A, with consequent minimal disturbing effect on the lubricating oil film supporting the main radial load $R_o$ at the interface 15-28.

Suitable means (not shown) is provided for draining the lubricating oil after it has performed its lubricating function at the lubricated regions back to a suitable sump for recirculation.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a rotatable journal member, a pivoted pad bearing supporting said journal member for rotation, stationary structure supporting said pivoted pad bearing for pivotal movement, said pivoted pad bearing including a journal bearing surface extending in a generally circumferential and also in a generally axial direction of said journal member whereby to journal said journal member for rotation, said journal member including a thrust shoulder contiguous an axial end of said pivoted pad bearing, said pivoted pad bearing including at an axial end thereof a thrust surface adapted to cooperate with said thrust shoulder whereby to resist axial thrust forces on said journal member, said thrust shoulder on said journal member and said cooperating thrust surface on said pivoted pad bearing both lying in planes substantially parallel to each other and inclined to the plane of the radial load-circumferential load on said journal bearing surface, whereby to minimize the moment induced on said pivoted pad bearing by the resultant force acting on said thrust surface.

2. The combination defined in claim 1 in which the angle of inclination of said thrust surface is such that the line of action of said resultant passes substantially through the pivot point of said pivoted pad bearing.

3. The combination defined in claim 1 in which said resultant acts substantially perpendicularly to said thrust surface.

4. The combination defined in claim 1 in which said resultant includes a radial load component acting on said thrust surface and an axial thrust load component acting on said thrust surface.

5. The combination defined in claim 1 including means for discharging lubricant to the interface between said thrust surface and said thrust shoulder.

6. The combination defined in claim 5 including a discharge outlet opening at said thrust surface for discharging lubricant to the interface between said thrust surface and said thrust shoulder.

7. A pivoted pad bearing adapted to support a journal member for rotation and including a pivot means adapting said pivoted pad bearing for pivotal movement on a stationary supporting structure, said pivoted pad bearing including a journal bearing surface extending in a generally circumferential and also in a generally axial direction of the journal member, said pivoted pad bearing including at an axial end thereof a thrust surface adapted to cooperate with a thrust shoulder on the journal member whereby to resist axial thrust forces on said journal member, said thrust surface on said pivoted pad bearing being inclined to the plane of the radial load-circumferential load acting on said journal bearing surface and adapted to be engaged by a substantially similarly inclined thrust shoulder on said journal member, whereby to minimize the moment induced on said pivoted pad bearing by the resultant force acting on said thrust surface.

8. A pivoted pad bearing as defined in claim 7 in which the angle of inclination of said thrust surface is such that the line of action of said resultant passes substantially through the pivot point of said pivoted pad bearing.

9. A pivoted pad bearing as defined in claim 7 in which said resultant acts substantially perpendicularly to said thrust surface.

10. A pivoted pad bearing as defined in claim 7 in which said resultant includes a radial load component acting on said thrust surface and an axial thrust load component acting on said thrust surface.

11. A pivoted pad bearing as defined in claim 7 including a discharge outlet opening at said thrust surface for discharging lubricant to said thrust surface.

* * * * *